(12) United States Patent
Ward et al.

(10) Patent No.: US 7,605,195 B1
(45) Date of Patent: Oct. 20, 2009

(54) EPOXY COATING SYSTEM

(75) Inventors: Michael E. Ward, Tuttle, OK (US); W. Douglas Frans, Edmond, OK (US)

(73) Assignee: Cass Polymers, Inc., Oklahoma City, OK (US)

( * ) Notice: Subject to any disclaimer, the term of this patent is extended or adjusted under 35 U.S.C. 154(b) by 297 days.

(21) Appl. No.: 11/161,273

(22) Filed: Jul. 28, 2005

(51) Int. Cl.
*C08G 59/00* (2006.01)
(52) U.S. Cl. ...................................... 523/400
(58) Field of Classification Search .................. 523/400
See application file for complete search history.

(56) References Cited

U.S. PATENT DOCUMENTS

| | | | |
|---|---|---|---|
| 4,891,394 A * | 1/1990 | Savin | 523/442 |
| 6,353,043 B1 | 3/2002 | Rice et al. | |
| 6,497,078 B1 * | 12/2002 | Haque et al. | 52/417 |
| 6,679,943 B1 * | 1/2004 | Newton et al. | 106/287.14 |
| 6,911,109 B2 | 6/2005 | Giroux et al. | |
| 2002/0028874 A1 * | 3/2002 | Nothnagel et al. | 524/591 |

OTHER PUBLICATIONS

Milimar Coatings LLC, Supercoat (Part A and Part B) Material Safety Data Sheet, May 14, 2001, Oklahoma City OK, USA (6 pages).
Milimar Coatings LLC, Supercoat Tri-Fold Brochure, 2001, Oklahoma City OK, USA (2 pages).
Milimar Coatings LLC., Supercoat Product Data Sheet, 2001, Oklahoma City OK, USA (2 pages).
Milimar Coatings LLC., PolyMax (Part A and Part B) Material Safety Data Sheet, May 14, 2001, Oklahoma City OK, USA (10 pages).
Milimar Coatings LLC, PolyMax Product Data Sheet, Mar. 2004, Oklahoma City OK, USA (2 pages).
Milimar Coating LLC, PolyMax Information Sheet, "PM-400: Breathabel Floor Coating," Mar. 31, 2003, Oklahoma City OK, USA (1 page).
Milimar Coatings LLC, PolyMax Information Sheet, "PM-400: It's not just a coating anymore!" Jul. 8, 2003, Oklahoma City OK, USA (1 page).

* cited by examiner

*Primary Examiner*—Mark Eashoo
*Assistant Examiner*—Megan McCulley
(74) *Attorney, Agent, or Firm*—Mary M. Lee

(57) ABSTRACT

A "hybrid" epoxy resin coating system formed by a solvent-borne epoxy resin and a water-reducible curing agent. The coating formed by this system exhibits excellent resistance to most household chemicals, and yet is permeable to water vapor transmission to reduce blistering. Although the epoxy resin is solvent-based, the total VOC content of the mixture is less than 150 grams per liter, providing a low odor mixture that is environmentally friendly. Additives in the curing agent component, including a silicone surfactant, provide a coating that adheres well even to a surface that is less than ideally prepared; no acid etching or other special surface preparation is required. All the colorant is on one side of the system, preferably in the resin component. Thus, incomplete mixing will not substantially affect the color of the finished coating. All these features make this coating system ideally suitable for use by nonprofessionals.

10 Claims, No Drawings

EPOXY COATING SYSTEM

FIELD OF THE INVENTION

The present invention relates generally to epoxy resin coatings and, more particularly, but without limitation, to waterborne two-part epoxy resin coatings.

DETAILED DESCRIPTION OF THE PREFERRED EMBODIMENT

Epoxy resin compositions provide excellent protective and decorative coatings for concrete and many other substrates. Two-part epoxy coating systems are popular because they provide good coverage and a durable surface. Two-part epoxy systems are so called because they comprise two components, an epoxy resin and a curing agent. The two components must be stored separately and combined shortly before use.

Traditionally, solvent-based epoxy resin coatings were preferred because they provided a hard and chemically resistant barrier with good adhesion strength. However, increasingly strict regulatory limitations on the volatile organic compounds ("VOC's") in these compositions have driven improvements in waterborne epoxy resin technology. Waterborne epoxy resin systems provide an environmentally friendly alternative to the solvent-based products. However, the reduced VOC content is accompanied in most waterborne systems by reduced adhesion strength and chemical resistance.

The present invention provides a water-borne two-part epoxy resin coating system that cures at ambient temperatures. The inventive composition combines low VOC content, ease of use and clean up, minimal or no induction time, sustained pot life, predictable surface color, substantially decreased blistering due to hydrostatic pressure from moisture remaining in or under the substrate, and superior surface integrity with minimal substrate preparation. The coating provided by this system is resistant to most chemicals found in household and light industrial environments, and to delamination caused by hot tires. These and other advantages of the present invention will be apparent from the following description of a preferred embodiment.

In accordance with the present invention there is provided a water-borne two-part epoxy resin coating composition that cures at ambient temperatures and is ideally suited for use on concrete substrates. The two components of the composition include an epoxy resin ("Part A") and a curing agent ("Part B") capable of curing the resin.

The abbreviations or trade names listed in Tables 1 (Part A) and 2 (Part B) will be used for components that are advantageously included in coating compositions of the present invention and in the example provided herein.

TABLE 1

| Abbreviation/ Trade Name | Description | Chemical Name or Identification | Source |
| --- | --- | --- | --- |
| GY 6010 | epoxy resin | 189 equivalent weight liquid bis A epoxy resin (reaction product of epichlorohydrin and bisphenol A) | Huntsman Advanced Materials Americas, Inc. The Woodlands TX |
| ED-45646 ICT Tan | reactive tint ("colorant") | epoxy dispersion | Plasticolors, Inc. Ashtabula OH |
| R900 | white | titanium dioxide | DuPont |

TABLE 1-continued

| Abbreviation/ Trade Name | Description | Chemical Name or Identification | Source |
| --- | --- | --- | --- |
| | pigment | (rutile grade, chloride process) | Wilmington DE |
| Cardura E-10 | reactive diluent | glycidyl neodeconate with a 250 epoxide equivalent weight | Resolution Performance Products Houston TX |

TABLE 2

| Abbreviation/ Trade Name | Description | Chemical Name or Identification | Source |
| --- | --- | --- | --- |
| Epi-Cure 8537WY-60 | curing agent | water-reducible amine adduct with a 175 equivalent weight | Resolution Performance Products Houston TX |
| BYK 110 | pigment stabilizer | phosphated polyester with residual phosphoric acid | BYK CHEMIE Wallingford CT |
| BYK 025 | defoaming agent | mixture of polysiloxanes | BYK CHEMIE Wallingford CT |
| BYK 348 | silicone surfactant | polyether-modified dimethylpolysiloxane | BYK CHEMIE Wallingford CT |
| Surfynol 485W | nonionic surfactant | ethoxylated acetylenic diol | Air Products and Chemicals, Inc. Allentown PA |
| Unimin A-10 Silica | filler | crystalline silica | US Silica Company Berkeley Springs WV |

The preparation and composition of the resin component or Part A may vary, but will include at a minimum an epoxy resin. Preferably, the epoxy resin is a solvent-borne liquid epoxy resin. More preferably, the resin is the reaction product of epichlorohydrin and bisphenol A. The most preferred resin is GY 6010 (Table 1). Preferably, the epoxy resin is present in Part A in the amount of about 10 to about 40 weight percent, more preferably 20 to 30 weight percent, and most preferably in the amount of about 22.97 weight percent.

The viscosity and clarity of the Part A component may be adjusted as desired by additives such as isopropyl alcohol, preferably anhydrous isopropyl alcohol. Usually the amount of isopropyl alcohol will be less than about 10 weight percent, the preferred amount for the present embodiment being about 2.14 weight percent.

The coating is given its particular color or hue by the addition of colorants to either or both of the components. As used herein, "colorant" includes any tint or pigment capable of significantly affecting the color or hue of the coating or the shade of the coating, that is, the relative depth or gradation of a particular color or hue. Thus, "colorant" includes hiding pigments, such as titanium dioxide, but does not include extender pigments that are substantially color neutral.

In accordance with the preferred practice of the present invention, all the colorant compounds are on one side of the system. Most preferably, all the colorant is in Part A, the resin side. This reduces or eliminates undesirable color variations that result from incomplete mixing of the two components.

In the present embodiment, the colorants in the system comprise a tint and a hiding pigment. Of course, the number, types and relative amounts of colorant are determined by the desired color of the finished coating, and may vary widely.

The tint is primarily responsible for the color or hue of the coating, such as tan or green. The preferred tint for the present embodiment is a reactive epoxy tint, which may be in a paste or concentrated form, such as ED-45646 ICT Tan (Table 1). The selected amount in this embodiment is about 30.82 weight percent of Part A.

In most instances, the colorants in the system also will include a significant amount of a hiding pigment, which contributes positively to the "hide" factor of the coating as well as altering the shade or gradation of the color in the tint. A preferred hiding pigment for this purpose is dry titanium dioxide, such as R900 (Table 1), which in the preferred system is present in the amount of about 34.37 weight percent, though this can vary widely depending on the desired properties of the coating.

Other additives may be utilized in Part A to modify and improve various performance characteristics of the Part A component or the application mixture or the ultimate coating. For example, to achieve desirable fluidity, viscosity and workability, reactive diluent or epoxy diluent preferably is added to Part A of this composition. One suitable diluent for this purpose is Cardura E-10 (Table 1). In this particular system, it is added in the amount of about 9.70 weight percent of the Part A composition.

The preferred method of preparing the above materials to form the Part A component now will be described. The method begins by adding the resin, the alcohol, and the colorant, in that order, into a mixing vessel, such as a tank equipped with a high speed disperser with Cowles dissolver blade. After agitating the mixture for about 5 minutes, the titanium dioxide particles are added. Mixing is continued until the titanium dioxide particles are milled sufficiently, preferably to about 6-7 on a Hegman scale. Finally, the diluent is added, and the mixture is agitated for another 30 minutes or until sufficiently blended.

The Part B component of the coating system of this invention comprises a substantial portion of water. In the preferred practice, the Part B composition comprises from about 20 to about 50 weight percent water. More preferably, water is present in an amount of about 30 to about 40 weight percent, and most preferably is present in an amount of about 37.94 weight percent. Purified water is preferred but not required.

The curing agent preferably is a water-reducible polyamide, more preferably is a polyethylene polyamine adduct in combination with acetic acid and 2-propoxyethanol, and most preferably is 8537-WY-60 (Table 2).

A filler or extender of some sort usually is indicated. Suitable fillers include silica, barium sulfate, magnesium silicate, calcium carbonate, and synthetic or glass beads. A-10 Silica (Table 2), a crystalline silica material, is employed in this application; this will give the completed coating abrasion resistance. The amount of filler may vary. The preferred embodiment described herein comprises about 17.32 weight percent silica.

Where crystalline silica is used as the filler, it may be advantageous to include an emulsifier to assist in the dispersion of the silica particles in the mixture. Various emulsifiers are commercially available. One suitable emulsifier for this particular coating system is a nonionic surfactant, such as Surfynol 485W (Table 2), which is present in the Part B component in the amount of about 3.46 weight percent.

In accordance with the present invention, the ultimate performance of the fully cured coating on the substrate is affected significantly by the addition of certain additives. Preferably, performance additives for the Part B component include one or more of the following: pigment stabilizers, anti-foam or defoaming agents, and silicone surfactants. The relative amounts of these additives should be optimized for each specific system.

Without wishing to be bound by theory, it is believed that a silicone surfactant provides greater adhesion between the applied coating and the concrete substrate, which preserves the contact even on poorly prepared or especially smooth or polished concrete. As used herein, "silicone surfactant" refers to a surfactant having a dimethylsiloxane group. A most preferred silicone surfactant is a polyether-modified dimethylpolysiloxane, such as BYK 348 (Table 2). Preferably, the silicone surfactant is added in amount of at least about 0.25 weight percent, and more preferably in an amount of at least about 0.50 weight percent. A particularly preferred amount is about 0.76 weight percent.

Appropriate pigment stabilizers include copolymer solutions with acidic groups. A preferred pigment stabilizer is a phosphated polyester with residual phosphoric acid, such as BYK 110 (Table 2). This material is added in the amount of about 0.55 weight percent in the preferred Part B component.

Various anti-foam or defoaming agents are readily available. BYK 025 (Table 2), a mixture of polysiloxanes, performs particularly well and may be added in an amount of about 0.76 weight percent.

To prepare the Part B component, the water, the curing agent, the additives (BYK 110, BYK 025, and BYK 348), and the emulsifier, in that order, are weighed into a non-reactive mixing vessel, such as a stainless steel tank equipped with a high speed disperser with a Cowles dissolver blade. After agitating these materials for about 5 minutes, the silica is added. Agitation is continued for a time sufficient to mill the silica particles adequately, preferably to about 5-6 on a Hegman scale.

The epoxy coating system of the present invention is illustrated by, but not limited to, the following example of a water-borne, two-part, ambient temperature curable, epoxy resin coating system that produces a tan colored coating suitable for concrete surfaces, such as garage floors.

EXAMPLE

Part A of the coating composition contained the items listed in Table 3

TABLE 3

| Item | Quantity (lbs.) | Percent by Volume | Percent by Weight |
| --- | --- | --- | --- |
| GY 6010 | 322.0000 | 33.19 | 22.97 |
| Isopropyl Alcohol Anhydrous | 30.0000 | 4.55 | 2.14 |
| ED-45656 ICT Tan | 432.0000 | 30.35 | 30.82 |
| R900 | 481.7700 | 13.81 | 34.37 |
| Cardura E.10 | 136.0000 | 18.10 | 9.70 |

Using a high speed disperser equipped with a Cowles dissolver blade in a carbon steel tank, the GY6010, alcohol and colorant were mixed for about 5 minutes. The R900 was added while agitation of the mixture continued. Agitation was maintained until the titanium dioxide (R900) was milled to about 7 on a Hegman scale, which was about 30 minutes. Then, the Cardura E-10 was added and mixing continued for another 30 minutes.

Part B of the coating composition contained the items listed in Table 4.

TABLE 4

| Item | Quantity (lbs.) | Percent by Volume | Percent by Weight |
| --- | --- | --- | --- |
| Water | 368.0000 | 44.09 | 37.94 |
| 8537-WY-60 | 380.1700 | 42.17 | 39.20 |
| BYK 110 | 5.3000 | 0.62 | 0.55 |
| BYK 025 | 7.4000 | 0.92 | 0.76 |
| BYK 348 | 7.4000 | 0.84 | 0.76 |
| Surfynol 485W | 33.6000 | 3.76 | 3.46 |
| A-10 Silica | 168.0000 | 7.60 | 17.32 |

Using a high speed disperser equipped with a Cowles dissolver blade in a stainless steel tank, and added in the order listed, the water, 8537-WY-60, BYK 110, BYK 025, BYK 348, and the Surfynol 485W were mixed for about 5 minutes. The silica was added while agitation of the mixture continued. Agitation was maintained until the silica was milled to about 6 on a Hegman scale, which was about 20 minutes.

When used as recommended, this system produces a tan colored water-borne composition, which requires no induction time and has a pot life of about 3 hours. The VOC content is about 134.5 grams per liter. The composition, once applied, is highly resistant to moisture vapor blistering. Surface preparation may be limited to cleaning, stripping (if applicable), degreasing, and drying; no acid etching or other special preparation techniques are required for optimum performance. The applied coating is dry enough for foot traffic in about 12 hours and for vehicular traffic in about 72 hours. Anti-slip aggregate may be added to the mixture before applying, and decorative chips may be added to the moist surface immediately after application. When used as directed, a single coat usually is sufficient. A glaze coat is recommended, but not required.

In accordance with one embodiment of the present invention, the composition is provided as a "do-it-yourself" kit for nonprofessional users. The kit will include a container of the resin component and a separate container of the curing agent component, preferably in stoichiometric amounts, to produce a total volume of mixture sufficient for one-coat coverage of at least an average size room or garage floor, or about 250 square feet. By way of example, a preferred kit will include 0.232 gallons of Part A and 0.568 gallons of Part B.

Other tools and materials may be included in the kit. For proper mixing of the composition, stirring sticks are provided. Surface preparation tools and materials, such as cleaning and degreasing solutions, are convenient additions to the kit. Coating additives may be included. Among these are anti-slip compositions, such as aluminum oxide powder, and decorative flakes or chips in assorted shapes and colors. Glaze compounds for finishing the coating may be provided. Finally, good instructions ensure customer satisfaction.

The mixing and application should be carried out at temperatures between about 60 to about 95 degrees Fahrenheit and at a relative humidity of about 80 percent or less. The user should employ appropriate safety measures, such as gloves, safety glasses, protective clothing, and rubber gloves. The coating system should only be utilized in well ventilated areas.

Good surface preparation is important to obtain optimum coating performance. The surface should be cleared of dirt, dust and other debris and should be free of oil, curing compounds, sealers and loose paint. As indicated, the preferred kit will include a suitable cleaner/degreaser. Well used or otherwise highly polished concrete surfaces may need abrasive treatment prior to application of the coating composition.

The Part A and Part B components should be mixed individually and then mixed together thoroughly, but not so vigorously that air bubbles are formed. Anti-slip aggregate may be added during the mixing step. Application of the mixture may be accomplished using painting tools and procedures.

After application and before the coating dries, decorative chips may be cast across the coating. This is usually done in small sections. For additional durability or a high gloss finish, or both, a glaze coat may be applied.

Prior to curing, clean up requires only soap and water. A solvent such isopropyl alcohol may be used to remove dried resin (Part A). At the prescribed temperature range, the coating will cure sufficiently for foot traffic in about 12 hours. Complete curing, sufficient for vehicular traffic, will take approximately 72 hours.

Now it will be appreciated that the present invention provides a water-borne two-part epoxy resin coating with many advantages. Non-professional users of two-part coatings often fail to completely empty one or both of the containers. If the colorant is divided between the two containers, incomplete mixing may adversely affect the color of the coating. In the system of the present invention, all the colorant is on one side. As a result, incomplete combining or mixing of the two components has no significant effect on the color of the final coating.

Although solvent-based coatings provide strongest substrate adhesion generally, they will blister in response to hydrostatic pressure from moisture remaining in or beneath the substrate. While the adhesion strength and chemical resistance of most water-borne coatings are less than that of their solvent-borne counterparts, the water-borne coatings are much less prone to water vapor blistering. The "hybrid" formulation of the present invention achieves the superior adhesion strength and "breathability," or blister resistance. In addition, the coatings provided by this invention are characterized by superior resistance to chemicals commonly found in household and small office environments.

Changes can be made in the combination and arrangement of the various parts and steps described herein without departing from the spirit and scope of the invention.

What is claimed is:

1. A two-part epoxy coating system comprising:
    an epoxy resin component comprising a solvent, an epoxy resin, and at least one colorant, wherein the colorant comprises a reactive epoxy tint in an amount equal to about 30.82 weight percent of the epoxy resin component; and
    a curing agent component comprising water and a water-reducible curing agent capable of curing the epoxy resin component and wherein the curing agent component is colorant-free.

2. The epoxy coating system of claim 1 wherein the colorant comprises a hiding pigment.

3. The epoxy coating system of claim 2 wherein the hiding pigment comprises titanium dioxide and wherein the epoxy resin component further comprises a reactive diluent, and wherein the curing agent component further comprises a silicone surfactant, an emulsifying agent comprising a nonionic surfactant, and crystalline silica.

4. The epoxy coating system of claim 3 wherein the epoxy resin comprises the reaction product of epichlorohydrin and bisphenol A, wherein the reactive diluent comprises glycidyl neodeconate, and wherein the epoxy resin component further comprises isopropyl alcohol.

5. The epoxy coating system of claim 4 wherein the epoxy resin comprises a solvent-borne liquid epoxy, and wherein the liquid epoxy is present in the epoxy resin component in the amount of from about 20 to about 25 weight percent, wherein the isopropyl alcohol is present in the epoxy resin component in the amount of from about 2.0 to about 2.25 weight percent, and wherein the titanium dioxide is present in the epoxy resin component in the amount of from about 30 to about 40 weight percent, and wherein the glycidyl neodeconate is present in the epoxy resin component in the amount of from about 9 to about 10 weight percent.

6. The epoxy coating system of claim 3 wherein the curing agent component further comprises a defoaming agent and a pigment stabilizer.

7. The epoxy coating system of claim 6 wherein the defoaming agent comprises polysiloxanes and is present in the curing agent component in the amount of from about 0.5 to about 1.0 weight percent, and wherein the pigment stabilizer comprises phosphated polyester and is present in the curing agent component in the amount of from about 0.5 to about 1.0 weight percent.

8. The epoxy coating system of claim 1 wherein the water-reducible curing agent comprises water-reducible polyamide.

9. The epoxy coating system of claim 8 wherein the water-reducible polyamide comprises a polyethylene polyamine adduct, acetic acid and 2-propoxyethanol, wherein the silicone surfactant comprises a polyether-modified dimethylpolysiloxane, wherein the nonionic surfactant comprises ethoxylated acetylenic diols.

10. The epoxy coating system of claim 9 wherein the water is present in the curing agent component in the amount of from about 30 to about 40 weight percent, wherein the water-reducible polyamide is present in the curing agent component in the amount of from about 35 to about 45 weight percent, wherein the silicone surfactant is present in the curing agent component in the amount of from about 0.5 to about 1.0 weight percent, wherein the nonionic surfactant is present in the curing agent component in the amount of from about 3.0 to about 4.0 weight percent, and wherein the silica is present in the curing agent component in the amount of from about 15 to about 20 weight percent.

* * * * *

UNITED STATES PATENT AND TRADEMARK OFFICE
CERTIFICATE OF CORRECTION

PATENT NO.       : 7,605,195 B1  Page 1 of 1
APPLICATION NO.  : 11/161273
DATED            : October 20, 2009
INVENTOR(S)      : Ward et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 680 days.

Signed and Sealed this

Fifth Day of October, 2010

David J. Kappos
*Director of the United States Patent and Trademark Office*